US012752281B2

(12) United States Patent
Yu et al.

(10) Patent No.: US 12,752,281 B2
(45) Date of Patent: Oct. 6, 2026

(54) CRUSHING AND DRYING DEVICE

(71) Applicant: CONTEMPORARY AMPEREX TECHNOLOGY (HONG KONG) LIMITED, Hong Kong (CN)

(72) Inventors: Haohua Yu, Ningde (CN); Haohao Yan, Ningde (CN); Jiancheng Cai, Ningde (CN); Ganyu Xu, Ningde (CN); Guangsheng Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 297 days.

(21) Appl. No.: 18/501,046

(22) Filed: Nov. 3, 2023

(65) Prior Publication Data

US 2024/0326066 A1 Oct. 3, 2024

Related U.S. Application Data

(63) Continuation of application No. PCT/CN2023/097794, filed on Jun. 1, 2023.

(30) Foreign Application Priority Data

Apr. 3, 2023 (CN) ........................ 202320709878.7

(51) Int. Cl.

| | |
|---|---|
| ***B02C 15/00*** | (2006.01) |
| ***B02C 13/18*** | (2006.01) |
| ***B02C 23/18*** | (2006.01) |
| ***B02C 23/20*** | (2006.01) |

(52) U.S. Cl.

CPC ............ *B02C 15/001* (2013.01); *B02C 13/18* (2013.01); *B02C 23/18* (2013.01); *B02C 23/20* (2013.01)

(58) Field of Classification Search

CPC ......... B02C 23/18; B02C 23/24; B02C 23/26; B02C 13/14; B02C 13/18; B02C 2013/1892; B02C 21/00; B02C 15/001; F26B 3/06; F26B 3/10

See application file for complete search history.

(56) References Cited

FOREIGN PATENT DOCUMENTS

| | | | |
|---|---|---|---|
| CN | 2323333 Y | * | 6/1999 |
| CN | 107520002 A | | 12/2017 |
| CN | 111359762 A | | 7/2020 |
| CN | 211964443 U | | 11/2020 |
| CN | 114485058 A | | 5/2022 |

(Continued)

OTHER PUBLICATIONS

Translation of JP-2015231621.*

(Continued)

*Primary Examiner* — Bobby Yeonjin Kim

(74) *Attorney, Agent, or Firm* — XSENSUS LLP

(57) ABSTRACT

Embodiments of the present application provide a crushing and drying device, including: a classification unit, a first box body, and a second box body connected in sequence along the direction of gravity, the first box body being configured to accommodate and crush materials, the second box body being configured to convey airflow to the first box body to dry the materials, and the classification unit being configured to screen out and discharge crushed and dried target materials, the target materials being materials with particle sizes less than a preset threshold.

20 Claims, 5 Drawing Sheets

(56) References Cited

FOREIGN PATENT DOCUMENTS

| | | | | | |
|---|---|---|---|---|---|
| EP | 2351616 | A1 | | 8/2011 | |
| EP | 2908077 | A1 | | 8/2015 | |
| JP | 2001-041652 | A | | 2/2001 | |
| JP | 2015231621 | A | * | 12/2015 | |
| JP | 6544672 | B | | 7/2019 | |
| JP | 2019-136697 | A | | 8/2019 | |
| KR | 10-2015-0052298 | A | | 5/2015 | |
| WO | WO-2014057851 | A1 | * | 4/2014 | .............. F26B 3/084 |

OTHER PUBLICATIONS

Translation of WO-2014057851.*
Translation of CN-2323333.*
Office Action issued Jun. 24, 2025 in Japanese Patent Application No. 2024-500488 with machine English translation thereof.
Notice of Grant of Utility Model Patent Rights issued May 26, 2023 in Chinese Patent Application No. 202320709878.7 with machine English translation thereof.
International Search Report and Written Opinion issued Dec. 24, 2023 in International Patent Application No. PCT/CN2023/097794 with machine English translation thereof.
Office Action issued Oct. 28, 2025 in Japanese Patent Application No. 2024-500488 with machine English translation thereof.
Extended European Search Report issued Jan. 15, 2026 in European Patent Application No. 23805837.4.
Office Action issued Mar. 25, 2026 in Korean Patent Application No. 10-2023-7038302 with English translation thereof.

* cited by examiner

CRUSHING AND DRYING DEVICE

CROSS-REFERENCE TO RELATED APPLICATIONS

The present application is a Continuation of International Application No. PCT/CN2023/097794, filed on Jun. 1, 2023, which claims the priority of Chinese Patent Application No. 202320709878.7 filed on Apr. 3, 2023, and entitled "CRUSHING AND DRYING DEVICE", the entire contents of each of which are incorporated herein by reference.

TECHNICAL FIELD

The present application relates to the technical field of industrial devices, and in particular, to a crushing and drying device.

BACKGROUND

At present, the preparation process of powder materials for chemical products mainly includes: batching, reaction manufacturing, washing, filtering, drying, crushing, mixing, and finished products, where powder drying and crushing are the most important factors affecting the stability of product quality.

In the existing powder production process, it is often necessary to use oven-drying and crushing devices to dry and crush powder in sequence, which will not only result in more devices, large floor space, but also a long process flow, affecting the preparation efficiency of the products.

SUMMARY OF THE DISCLOSURE

Embodiments of the present application provides a crushing and drying device, which can crush and dry materials at the same time, thereby reducing the occupied area of the device and improving the preparation efficiency of target materials.

In a first aspect, provided is a crushing and drying device, including: a classification unit, a first box body, and a second box body connected in sequence along the direction of gravity, the first box body being configured to accommodate and crush materials, the second box body being configured to convey airflow to the first box body to dry the materials, and the classification unit being configured to screen out and discharge crushed and dried target materials, the target materials being materials with particle sizes less than a preset threshold.

The crushing and drying device provided by the embodiment of the present application can crush and dry the materials at the same time, which can not only reduce the occupied area of the device, but also improve the preparation efficiency of the target materials.

In some possible implementations, the second box body includes a heat insulating component at the bottom, which is configured to prevent heat of the airflow from diffusing downward.

In the above embodiment, the heat insulating component is disposed at the bottom of the second box body, which can block downward diffusion of the heat of the airflow to a certain extent, reduce heat loss, and thus improve the drying effect of the materials.

In some possible implementations, an air inlet is formed in the side wall of the second box body, and the airflow enters the second box body through the air inlet.

In the above embodiment, the airflow enters the second box body through the air inlet and then moves upward, and can be discharged upward under the action of the bottom wall of the second box body, so that the materials in the first box body can be dried.

In some possible implementations, the airflow is hot airflow.

In the above embodiment, the materials are dried by the hot airflow, which can improve the drying effect of the materials.

In some possible implementations, the crushing and drying device further includes a first rotation shaft; a crushing component is disposed at the bottom of the first box body, and the crushing component is fixed to the first rotation shaft and configured to crush the materials while the first rotation shaft rotates.

In the above embodiment, the crushing component is disposed at the bottom of the first box body, and the crushing component can be rotated under the drive of the first rotation shaft, so as to crush the materials. At the same time, during the crushing process of the materials, the second box body conveys the airflow to the first box body, which can realize crushing and drying of the materials at the same time, thereby reducing the occupied area of the crushing and drying device and improving the preparation efficiency of the target materials.

In some possible implementations, the crushing component includes a body, a rotor and at least one grinding block; the rotor is disposed at the center of the body and is fixed to the first rotation shaft; and the at least one grinding block is disposed at an end of the body along the horizontal direction.

In the above embodiment, the crushing of the materials can be realized by the rotating grinding block in the crushing component.

In some possible implementations, the body is disc-shaped.

In the above embodiment, the body is configured as a disc shape, which facilitates rapid and smooth rotation of the crushing component, so as to improve the efficiency of material crushing.

In some possible implementations, a stator is disposed on the side wall of the first box body; and along the horizontal direction, the stator and the grinding block are disposed opposite to each other and have a gap therewith.

In the above embodiment, the stator is disposed on the side wall of the first box body, and the particle sizes of the crushed materials can be adjusted by adjusting the gap distance between the stator and the grinding block. In addition, the materials can be crushed by frictions of the stator and the grinding block on the materials, so that the probability that the side wall of the first box body is worn by the materials during the crushing process can be reduced, and the service life of the first box body can be improved.

In some possible implementations, along the extending direction of the first box body, the size of the grinding block is less than that of the stator.

In the above embodiment, the height of the grinding block is designed to be less than that of the stator, and wear to the side wall of the second box body positioned adjacent to the stator can be reduced, which is beneficial to prolonging the service life of the second box body.

In some possible implementations, the grinding block includes an alloy material.

In the above embodiment, the grinding block includes the alloy material, which can improve the hardness of the grinding block, and thus can reduce a wear rate of the grinding block and improve crushing strength to the materials.

In some possible implementations, the classification unit includes: a second rotation shaft, a third box body, and a classification wheel; a discharge port is formed in the side wall of the third box body; the classification wheel is disposed at the bottom of the third box body and fixed to the second rotation shaft, and is configured to screen out the target materials to the discharge port.

In the above embodiment, by disposing the classification wheel in the classification unit to screen the target materials, the fineness of the materials can be controlled by controlling a rotational speed of the classification wheel, thereby improving the quality of the target materials.

In some possible implementations, the classification unit further includes a scraper; the scraper is parallel to the direction of gravity, and one end of the scraper is fixed to a position on the second rotation shaft opposite to the discharge port.

In the above embodiment, by disposing the scraper in the third box body of the classification unit, the problem of the target materials hanging on the wall and the problem of blockage of the discharge port can be solved during the rotation of the scraper.

In some possible implementations, the crushing and drying device further includes: a feed unit, connected to the side wall of the first box body, and configured to pre-crush the materials, and convey the materials to the first box body.

In the above embodiment, by disposing the feed unit with a pre-crushing function, the sizes of the materials entering the first box body can be more uniform and the crushing efficiency of the target materials can be improved.

In some possible implementations, the feed unit includes: a feed port, a break-up component, and a screw conveying component connected in sequence along the direction of gravity; the break-up component is configured to pre-crush the materials; and the screw conveying component is configured to convey the pre-crushed materials to the first box body.

In the above embodiment, by pre-crushing the materials through the break-up component, the sizes of the materials can be more uniform, and in subsequent processing, the device or parts will not be blocked because the materials are too large. In addition, the materials can be stably conveyed to the first box body at a uniform speed by the screw conveying component, so that the stability of the target materials are improved.

In some possible implementations, the break-up component includes a third rotation shaft and a plurality of crushing columns disposed on the third rotation shaft.

In some possible implementations, the third rotation shaft is horizontally disposed.

In the above embodiment, when the third rotation shaft is placed horizontally, the contact area between the break-up component and the materials is larger, and the pre-crushing effect of the materials is better.

In some possible implementations, the screw conveying component includes at least two spirals oppositely disposed along the horizontal direction.

In the above embodiment, in the process of conveying materials, the at least two spirals can mix, stir and crush the materials, that is, the materials can be further processed, and the preparation efficiency of the target materials can be improved.

DESCRIPTION OF DRAWINGS

In order to illustrate the technical solutions of the embodiments of the present application more clearly, the drawings required in the embodiments of the present application will be briefly introduced below. Obviously, the drawings described below are only some embodiments of the present application. For those of ordinary skill in the art, other drawings can also be obtained according to the drawings without any creative effort.

Figure 1:
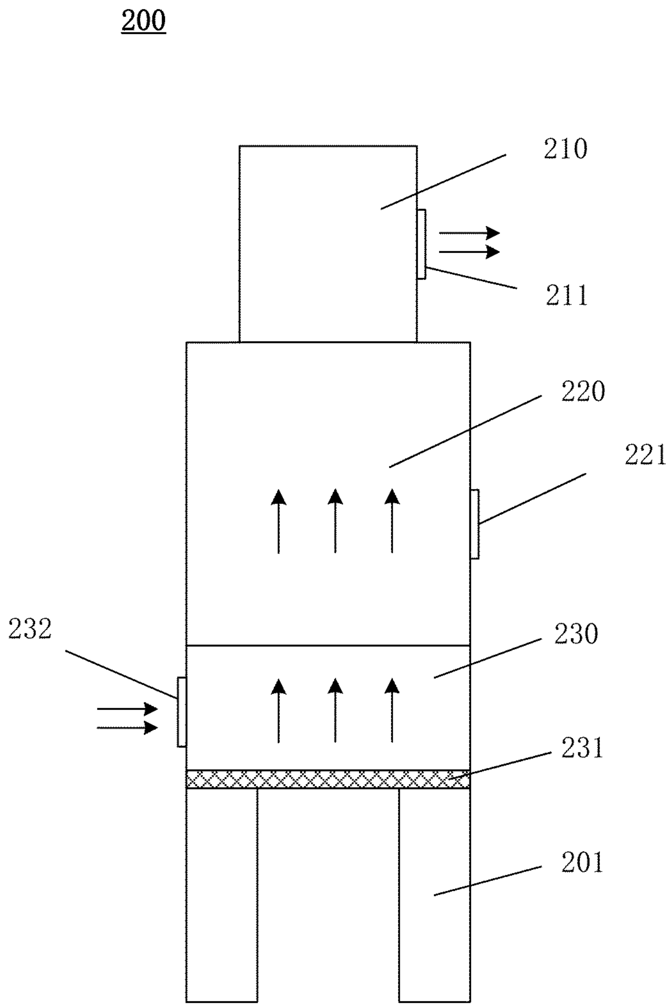
FIG. 1 is a schematic structural diagram of a crushing and drying device according to an embodiment of the present application.

In the drawings, the drawings are not drawn to actual scale.

DESCRIPTION OF REFERENCE NUMERALS crushing and drying device 200, classification unit 210, first box body 220, second box body 230, first rotation shaft 240, driven wheel 241, bearing seat 250, feed unit 260, base 201;
first feed port 221, crushing component 222, stator 223;
body 2221, rotor 2222, grinding block 2223;
discharge port 211, second rotation shaft 212, third box body 213, classification wheel 214, motor 215, coupling 216, scraper 217;
second feed port 261, break-up component 262, screw conveying component 263;
third rotation shaft 2621, crushing column 2622;
spiral 2631.

DETAILED DESCRIPTION

The implementations of the present application are further described in detail below with reference to the drawings and embodiments. The following detailed description of the embodiments and the drawings are used to illustrate the principles of the present application by way of example, but should not be used to limit the scope of the present application, that is, the present application is not limited to the described embodiments.

In the description of the present application, it should be noted that, unless otherwise stated, "plurality of" means two or more; the orientation or positional relationships indicated by the terms "upper", "lower", "left", "right", "inner" and "outer" are only for facilitating the description of the present application and simplifying the description, rather than indicating or implying that the apparatus or element referred to must have a particular orientation or be constructed and operated in a particular orientation, and therefore will not be interpreted as limiting the present application. In addition, the terms "first", "second", "third", etc. are used for descriptive purposes only, and cannot be construed as indicating or implying relative importance. "Vertical" is not strictly vertical, but within the allowable range of error. “Parallel” is not strictly parallel, but within the allowable range of error.

The orientation words appearing in the following description are directions shown in the figures, and do not limit the specific structure of the present application. In the description of the present application, it should be noted that the terms “mount”, “connect”, and “attach” in a broad sense, unless otherwise explicitly specified or defined. For example, thereby may be a fixed connection, a detachable connection, or an integrated connection; and there may be a direct connection or an indirect connection through an intermediate medium. For those of ordinary skill in the art, the specific meanings of the above terms in the present application may be understood according to specific circumstances.

In the present application, the term “and/or” is only an association relationship for describing associated objects, indicating that three relationships may exist. For example, A and/or B may represent three situations: A exists alone, both A and B exist, and B exists alone. In addition, the character “/” in the present application generally means that the associated objects before and after it are in an “or” relationship.

Unless otherwise defined, all technical and scientific terms used in the present application have the same meanings as those commonly understood by those skilled in the art to which the present application belongs. The terms used in the specification of the present application are merely for the purpose of describing specific examples, but are not intended to limit the present application. The terms “comprising/including” and “having” and any variations thereof in the specification and the claims of the present application as well as the foregoing description of the drawings are intended to cover non-exclusive inclusions. The terms “first”, “second” and the like in the specification and the claims of the present application as well as the above drawings are used to distinguish different objects, rather than to describe a specific order or primary-secondary relationship.

Reference herein to “embodiment” means that a particular feature, structure, or characteristic described in connection with the embodiment may be included in at least one embodiment of the present application. The appearance of this phrase in various places in the specification does not necessarily refer to the same embodiment, nor is a separate or alternative embodiment that is mutually exclusive of other embodiments. It is understood explicitly and implicitly by those skilled in the art that the embodiments described in the present application can be combined with other embodiments.

While the present application has been described with reference to the preferred embodiments, various modifications may be made and components therein may be replaced with equivalents without departing from the scope of the present application. In particular, the technical features mentioned in the various embodiments can be combined in any manner as long as there is no structural conflict. The present application is not limited to the specific embodiments disclosed herein, but rather includes all technical solutions falling within the scope of the claims.

At present, in the process of preparing functional materials, such as a positive electrode active material and a negative electrode active material of a battery, raw materials of the functional materials need to be crushed and dried to realize the powdering of the materials. However, in a current powdering process, the raw materials usually need to be separately processed by a crushing device, a drying device and other devices, which not only result in large occupied space of the devices, but also affects the preparation efficiency of the materials.

In view of this, the embodiment of the present application provides a crushing and drying device, which can crush and dry materials at the same time, thereby reducing the occupied space of the crushing and drying device and improving the preparation efficiency of the functional materials.

FIG. 1 is a schematic structural diagram of a crushing and drying device 200 according to an embodiment of the present application. As shown in FIG. 1, the crushing and drying device 200 may include: a classification unit 210, a first box body 220 and a second box body 230 connected in sequence along the direction of gravity.

The first box body 220 can be configured to accommodate and crush materials. The second box body 230 can be configured to convey airflow to the first box body 220 to dry the materials. The classification unit 210 can be configured to screen out and discharge crushed and dried target materials. The target materials are materials with particle sizes less than a preset threshold.

Optionally, the classification unit 210 and the first box body 220, as well as the first box body 220 and the second box body 230 can be connected by detachable connecting elements, and the connecting elements can be, for example, bolts and nuts, or can be connected by means of welding, gluing, etc., which is not limited in the present application.

Specifically, a first feed port 221 can be formed in the top wall or side wall of the first box body 220, the materials can enter the first box body 220 through the first feed port 221, and the first box body 220 may internally include a component for crushing the materials, as an example and not a limitation, a plurality of rotatable blades can be disposed on the inner wall of the first box body 220 to crush the materials while rotating. Optionally, a plurality of ventilation holes can be formed in opposite walls of the first box body 220 and the second box body 230, and the airflow of the second box body 230 moves upwards, and can pass through the plurality of ventilation holes to dry the materials in the first box body 220. A plurality of screen holes can be formed in opposite walls of the classification unit 210 and the first box body 220, and the size of the screen holes can be set according to particle size requirements of the target materials, for example, can be slightly greater than a preset threshold. In the first box body 220, crushed and dried materials move upwards under the action of the upward airflow, the materials with particle sizes less than the screen hole can pass through the screen hole, and the materials with particle sizes greater than the screen hole fall down and continue to be crushed and dried until meeting the particle size requirements. The classification unit 210 may include a discharge port 211, and the target materials meeting the particle size requirements are discharged through the discharge port 211 after being screened out through the screen holes. Optionally, a negative pressure fan can be further disposed on the outlet side of the discharge port 211, and works together with the internal airflow to suck out the target materials with particle sizes less than the preset threshold.

In the embodiment of the present application, the crushing and drying device 200 can crush and dry the materials at the same time, which can not only reduce the occupied area of the device, but also improve the preparation efficiency of the target materials.

It should be noted that in addition to the preparation of the above active materials, the crushing and drying device 200 provided in the embodiment of the present application can also be used in other scenarios, including but not limited to the preparation processes of powdery or granular materials in chemical, pharmaceutical, food and other industries.

Optionally, as shown in FIG. 1, the crushing and drying device may further include a base 201 configured to support the classification unit 210, the first box body 220 and the second box body 230.

In some embodiments, the second box body 230 may include a heat insulating component 231 at the bottom, and the heat insulating component 231 can be configured to prevent heat of the airflow from diffusing downward.

Optionally, the heat insulating component 231 may be a heat insulating layer, such as a heat insulating pad, which matches the size of the bottom of the second box body 230.

Optionally, the heat insulating component 231 can be detachably connected to the second box body 230, such as directly to the bottom of the second box body 230, which facilitates the replacement of the heat insulating component 231. Certainly, the heat insulating component 231 can also be fixedly connected to the bottom wall of the second box body 220, such as by bonding, which is not limited in the present application.

Optionally, the heat insulating component 231 can be made of a heat insulating material, which has the effect of heat insulation. As an example and not a limitation, the heat insulating component 231 can also be made of a lightweight carbonaceous material. On the one hand, the weight of the heat insulating component is relatively light, which can reduce the overall weight of the crushing and drying device 200. On the other hand, the heat insulating component 231 is made of the carbonaceous insulation material, which is relatively low in cost.

Optionally, other components, such as a support component, can be disposed under the second box body 230, and the heat insulating component 231 is disposed at the bottom of the second box body 230, which can also prevent heat from spreading downward, thereby reducing the probability of heat damage to the support component.

In the above embodiment, the heat insulating component 231 is disposed at the bottom of the second box body 230, which can prevent downward diffusion of heat of the airflow to a certain extent, reduce heat loss, and thus improve the drying effect of the materials.

In some embodiments, as shown in FIG. 1, an air inlet 232 can be formed in the side wall of the second box body 230, and the airflow can enter the second box body 230 through the air inlet 232. The direction of the airflow may refer to the direction of an arrow in FIG. 1.

Specifically, when the airflow enters the second box body 230 through the air inlet 232, the heat insulating component 231 at the bottom of the second box body 230 can produce a blocking and negative pressure effect on the airflow and the heat thereof, and the airflow can only be discharged upward, so that the materials in the first box body 220 are dried.

Optionally, the first box body 220 may be of a hollow structure, that is, the first box body 220 has no bottom wall, so that the airflow in the second box body 230 can be conveyed to the first box body 220, to improve the drying effect of the materials.

In some embodiments, the airflow may be hot airflow.

Optionally, the air inlet 232 can be connected to an air heater to provide the second box body 220 with hot airflow for drying the materials.

Optionally, the temperature and pressure of the hot airflow can be set according to requirements for the dryness of the materials.

In the above embodiment, the materials are dried by the hot airflow, which can improve the drying effect and efficiency of the materials.

Figure 2:
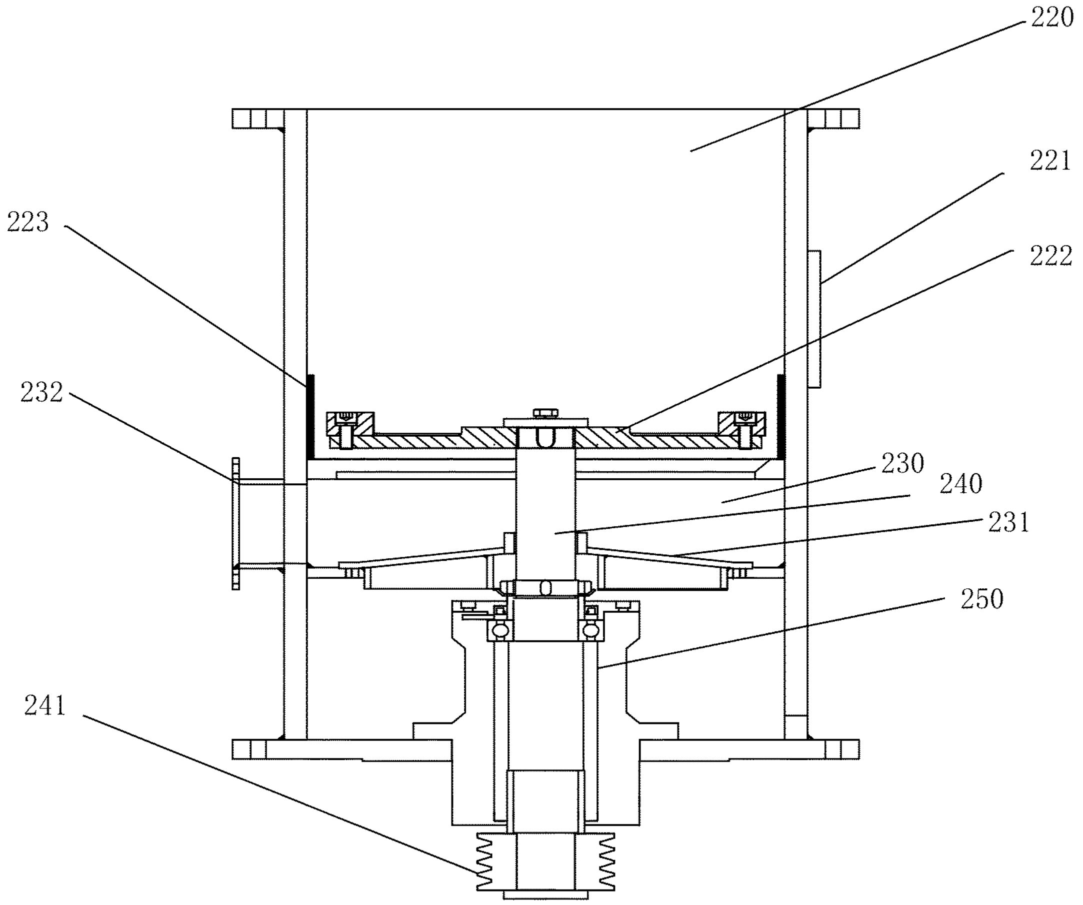
FIG. 2 is a schematic structural diagram of a first box body and a second box body according to an embodiment of the present application.

FIG. 2 is a schematic structural diagram of the first box body 220 and the second box body 230 in the embodiment of the present application.

In some embodiments, the crushing and drying device 200 may further include a first rotation shaft 240. As shown in FIG. 2, a crushing component 222 is disposed at the bottom of the first box body 220, and the crushing component 222 is fixed to the first rotation shaft 240 and can be configured to crush materials when the first rotation shaft 240 rotates.

Specifically, a driving device (not shown in the figure) can be connected to the lower end of the first rotation shaft 240, and the driving device can be disposed in the device base 201. The first rotation shaft 240 can be supported by a bearing seat 250 sleeved on the outside of the first rotation shaft 240. The bearing seat 250 may internally include a bearing, and the bearing can reduce the friction between the first rotation shaft 240 and the bearing seat 250 to make the rotation smoother.

It should be noted that the heat insulating component 231 disposed at the bottom of the second box body 230 can also prevent heat from spreading to the bearing seat 250, thereby reducing the probability of heat damage of the bearing seat 250.

As an example and not a limitation, the driving device may include a motor and a motor output shaft, the motor being connected to the motor output shaft, and a driving wheel is disposed on the motor output shaft. A driven wheel 241 can be disposed at the lower end of the first rotation shaft 240, and a transmission belt is provided between the driving wheel and the driven wheel 241. Through the transmission belt, the driving device can drive the first rotation shaft 240 to rotate.

When the first rotation shaft 240 starts to rotate, the crushing component 222 also rotates accordingly, so that the crushing component 222 generates centrifugal force in the process of rotation, which can throw the materials onto side wall of the first box body 220, and the materials fall down along the side wall of the first box body 220 to a position between the crushing component 222 and the first box body 220. During the rotation of the crushing component 222, the materials can be crushed and ground by friction between the crushing component and the materials, so that the particle sizes of the materials meet the requirements.

Optionally, as shown in FIG. 2, the crushing component 222 and the first rotation shaft 240 can be detachably connected, such as by bolts or the like.

According to the above embodiment, the crushing component 222 fixed to the first rotation shaft 240 is disposed at the bottom of the first box body 220, so that the crushing component 222 can crush the materials under the action of the first rotation shaft 240.

Figure 3:
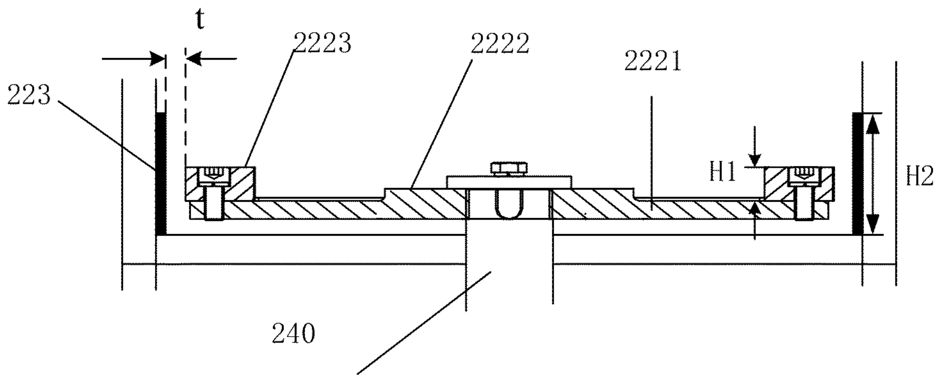
FIG. 3 is a diagram of a partial structure of the first box body according to an embodiment of the present application.

In some embodiments, as shown in FIG. 2 and FIG. 3, the crushing component 222 may include a body 2221, a rotor 2222 and at least one grinding block 2223. The rotor 2222 can be disposed at the center of the body 2221 and fixed to the first rotation shaft 240. At least one rotor 2222 can be disposed at an end of the body 2221 along the horizontal direction.

Specifically, the rotor 2222 is fixed to the first rotation shaft 240. When the driving device drives the first rotation shaft 240 to rotate, the rotor 2222 drives the body 2221 and at least one grinding block 2223 to start rotating around the first rotation shaft 240, and after the materials enter the first box body 220, the materials can be crushed by shearing force of the grinding block 2223 on the material and friction between the materials.

Specifically, as shown in FIG. 3, the body 2221 may be a hollow cylinder, and the hollow part is used for the first rotation shaft 240 to pass through. The rotor 2222 may also be a hollow cylinder having the same inner diameter as the body 2221 and is fixedly connected to the body 2221.

Optionally, the rotor 2222 can be integrally formed with the body 2221, or can be two separate components.

Optionally, as shown in FIG. 3, the grinding block 2223 can be detachably connected to the body 2221, such as connected to the body 2221 by bolts. Certainly, the grinding block 2223 can also be fixedly connected to the body 2221 by other means, such as welding or integral molding, which is not limited in the present application.

Optionally, there may be a plurality of grinding blocks 2223, and the plurality of grinding blocks 2223 can be uniformly disposed on the upper surface of the body 2221 along the circumferential direction of the body 2221.

Specifically, along the circumferential direction of the body 2221, one grinding block 2223 can be disposed at every fixed preset distance, and the shape and size of the plurality of grinding blocks 2223 can be the same. In this way, when the crushing component 222 is in a rotating state, better stability can be achieved.

In the embodiment of the present application, the materials can be crushed by the rotating grinding block 2223 in the crushing component 222.

In some embodiments, the body 2221 may be disc-shaped.

Specifically, the first box body 220 may be cylindrical, the disk-shaped body 2221 is coaxial with the first box body 220, and the diameter of the disk-shaped body 2221 is less than the diameter of the first box body 220.

In the above embodiment, the body 2221 is configured as a disc shape, which facilitates rapid and smooth rotation of the crushing component 222, so as to improve the efficiency of material crushing.

In some embodiments, as shown in FIG. 3, a stator 223 can be disposed on the side wall of the first box body 220, and along the horizontal direction, the stator 223 and the grinding block 2223 are disposed opposite to each other and have a gap t therewith.

Specifically, the stator 223 may be cylindrical and sleeved on the inner wall of the first box body 220, and the stator 223 can be disposed opposite to the outer periphery of the grinding block 2223. There is a gap t between the stator 223 and the grinding block 2223, and the size of the gap t can be set according to particle size requirements of the target materials.

Specifically, when the driving device drives the first rotation shaft 240 to rotate, the crushing component 222 rotates accordingly, so that after the materials enter the first box body 220, the crushing component 222 generates centrifugal force in the process of rotation, which can throw the materials onto the side wall of the first box body 220, and the materials fall down along the side wall of the first box body 220 to the gap t between the grinding block 2223 and the stator 223. During the rotation of the crushing component 222, the materials can be crushed and ground by shearing force of the grinding block 2223 on the materials, friction between the stator 223 and the materials, and friction between the materials.

Optionally, the size of the gap t between the stator 223 and the grinding block 2223 can be adjusted by increasing or decreasing the thickness of the stator 223, and certainly can also be adjusted by increasing or decreasing the diameter of the crushing component 222, which is not limited in the present application.

Optionally, the outer surface of the stator 223 may be rough, for example, burrs are disposed on the outer surface of the stator 223, so that the materials can be further crushed and the crushing efficiency of the materials can be improved.

In the embodiment of the present application, the stator 223 is disposed on the side wall of the first box body 220, and the particle sizes of the crushed materials can be adjusted by adjusting the gap distance between the stator 223 and the grinding block 2223. In addition, the materials can be crushed by the frictions of the stator 223 and the grinding block 2223 on the materials, which can reduce the probability that the side wall of the first box body 220 is worn by the materials during the crushing process, and can prolong the service life of the first box body 220.

In some embodiments, as shown in FIG. 3, along the extending direction of the first box body 220, the dimension H1 of the grinding block 2223 is less than the dimension H2 of the stator 223.

Specifically, the extending direction of the first box body 220 can be understood as the height direction of the first box body 220. Along the extending direction of the first box body 220, the dimension H1 of the grinding block 2223 is the height dimension of the grinding block 2223. Similarly, along the extending direction of the first box body 220, the dimension H2 of the stator 223 is the height dimension of the stator.

According to the embodiment of the present application, the height dimension of the grinding block 2223 is designed to be less than that of the stator 223, and wear to the side wall of the second box body 220 positioned adjacent to the stator 223 can be reduced, which is beneficial to prolonging the service life of the second box body 220.

In some embodiments, the grinding block 2223 includes an alloy material.

Alloy material is another kind of metal material produced by the fusing of two or more metals through special forging technology, and the hardness of the alloy material is generally greater than that of any metal in components thereof.

Specifically, the hardness of a grinding block 2223 can be increased by embedding the alloy material. As an example and not a limitation, the alloy material may be iron alloy, aluminum alloy, titanium alloy, or the like.

In the above embodiment, the grinding block 2223 includes the alloy material, which can improve the hardness of the grinding block, and thus can reduce a wear rate of the grinding block 2223 and improve crushing strength to the materials.

Figure 4:
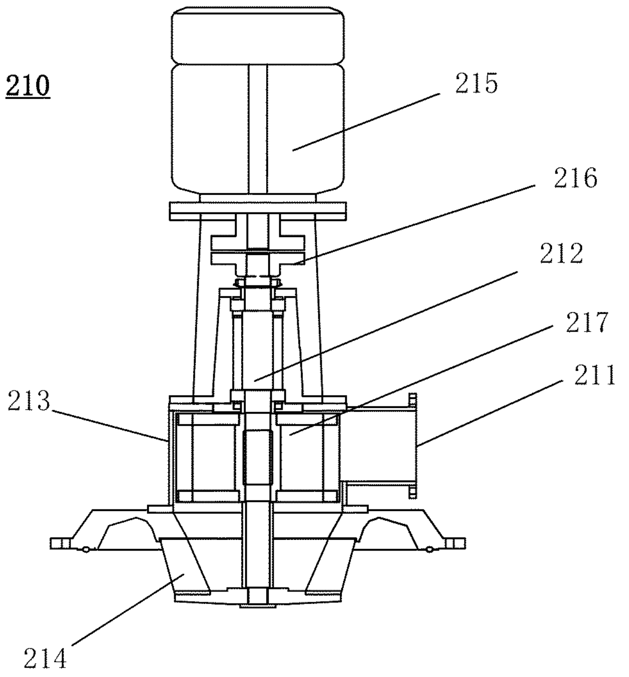
FIG. 4 is a schematic structural diagram of a classification unit according to an embodiment of the present application.

In some embodiments, as shown in FIG. 4, the classification unit 210 may include a second rotation shaft 212, a third box body 213 and a classification wheel 214. A discharge port 211 is formed in the side wall of the third box body 213. The classification wheel 214 is disposed at the bottom of the third box body 213 and fixed to the second rotation shaft 212, for screening the target materials out to the discharge port 211.

Specifically, a motor 215 can be connected to the upper end of the second rotation shaft 212. The motor 215 is connected to a coupling 216, and the coupling 216 is connected to the second rotation shaft 212. The second rotation shaft 212 can rotate under the drive of the motor 215. The classification wheel 214 can be fixed to the bottom end of the second rotation shaft 212, and when the second rotation shaft 212 rotates under the drive of the motor 215, the classification wheel 214 also rotates accordingly.

Specifically, the crushed and dried materials move upward under the action of the airflow, and meanwhile, the classification wheel 214 starts to rotate, which can generate an outward and downward swirling airflow. The materials rising with the airflow are affected by the swirling airflow, so that the materials with larger particles fall down along the inner wall of the classification wheel 214 and can be crushed and dried again until the materials with smaller particles are formed, and the smaller material particles (target materials) can pass through gaps between blades of the classification wheel 214, enter the third box body 213 and be sent out through the discharge port 211.

It should be noted that under the condition that other parameters remain unchanged, such as the pitch of the blades of the classification wheel 214, increasing a rotational speed of the classification wheel 214 can increase the fineness of the materials, and otherwise reduce the fineness of the materials. The classification wheel 214 can have an accurate particle size cutting point, and the rotational speed of the classification wheel 214 can be adjusted within a certain range according to different requirements for the required material particle size.

Optionally, as shown in FIG. 4, the classification wheel 214 and the second rotation shaft 212 can be detachably connected, such as by bolts.

In the present application embodiment, by disposing the classification wheel 214 in the classification unit 210 to screen the target materials, the fineness of the materials can be controlled by controlling the rotational speed of the classification wheel 214, thereby improving the quality of the target materials.

In some embodiments, as shown in FIG. 4, the classification unit 210 may further include a scraper 217, the scraper 217 being parallel to the direction of gravity, and one end of the scraper 217 being fixed to the position of the second rotation shaft 212 opposite to the discharge port 211.

Optionally, the scraper 217 may be made of metal or plastic.

It should be understood that the target materials screened out by the classification wheel 214 can hang on the wall of the third box body 213 under the action of the airflow and negative pressure. In addition, if the target materials are not collected in time, the discharge port 211 can also be blocked by the materials. When one end of the scraper 217 is fixed to the second rotation shaft 212, and the second rotation shaft 212 rotates under the drive of the motor 215, the scraper 217 also rotates accordingly, so that the target materials on the side wall of the third box body 213 can be scraped off, thereby solving the problem of the target materials hanging on the wall. In addition, one end of the scraper 217 is fixed to a position opposite to the discharge port 211. When the second rotation shaft 212 rotates under the drive of the motor 215, the scraper 217 also rotates accordingly, so that the target materials accumulated at the discharge port 211 can be removed, thereby solving the problem of blockage of the discharge port 211.

Optionally, the third box body 213 may be a cylinder, and the dimension of the scraper 217 along the horizontal direction may be slightly less than the radius of the third box body 213, so that the scraper 217 can rotate within the third box body 213 and also scrape off the materials on the inner wall of the third box body 213.

Optionally, an elastic strip, such as a rubber strip, can be disposed on an end of the scraper 217 opposite to the third box body 213. Due to the relatively soft characteristic of the rubber strip, the rubber strip can reduce the wear of the materials to the side wall of the third box body 213 during the rotation of the scraper 217 and improve the service life of the third box body 213.

In the above embodiment, by disposing the scraper in the third box body 213 of the classification unit 210, the problem of the target materials hanging on the wall and the problem of blockage of the discharge port 211 can be solved during the rotation of the scraper 217.

Figure 5:
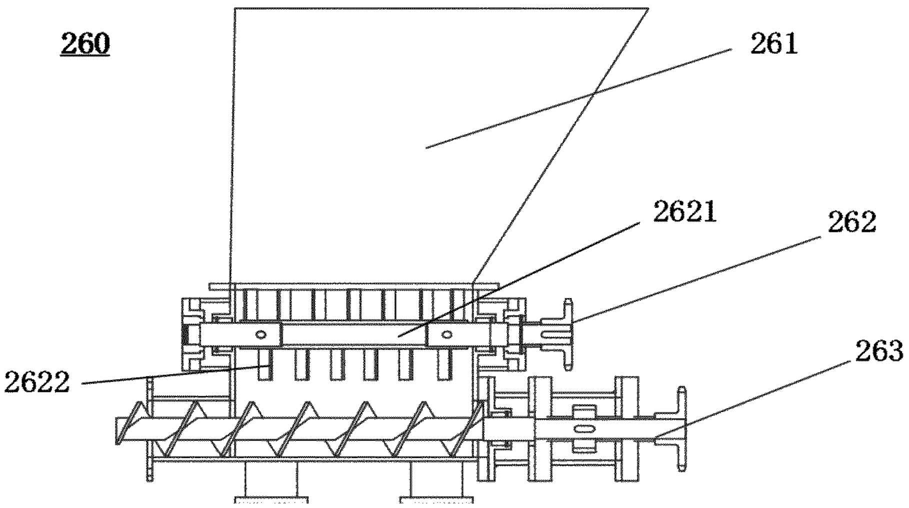
FIG. 5 is a schematic structural diagram of a feed unit according to an embodiment of the present application.
Figure 6:
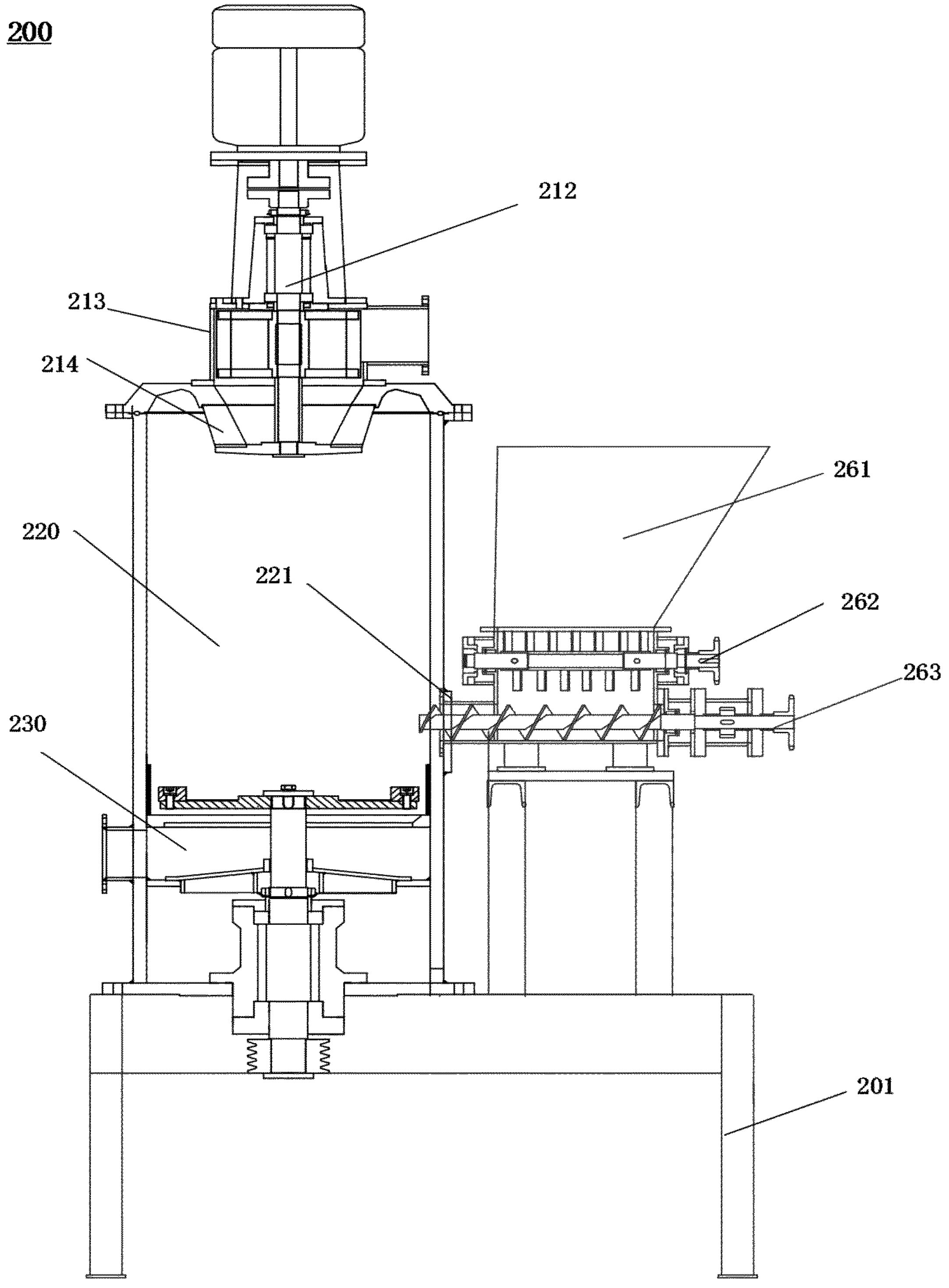
FIG. 6 is a schematic structural diagram of another crushing and drying device according to an embodiment of the present application.

In some embodiments, the crushing and drying device 200 further include a feed unit 260. As shown in FIG. 5 and FIG. 6, the feed unit 260 can be connected to the side wall of the first box body 220, and configured to pre-crush materials, and convey the materials to the first box body 220.

Specifically, the feed unit 260 can be disposed on one side of the first box body 220 and connected to the first feed port 221 in the side wall of the first box body 220.

Optionally, the connection between the feed unit 260 and the first box body 220 may be fixed, such as welding, or detachable, such as a bolt and nut connection, which is not limited in the present application.

Specifically, the interior of the feed unit 260 may include a component for pre-crushing the materials, that is, performing coarse crushing, and then pre-crushed materials are conveyed to the first box body for fine crushing.

In this way, the sizes of the materials entering the first box body 220 can be more uniform, and the crushing efficiency can be improved.

In some embodiments, as shown in FIG. 5, the feed unit 260 may include a second feed port 261, a break-up component 262 and a screw conveying component 263 sequentially connected along the direction of gravity. The break-up component 262 can be configured to pre-crush the materials. The screw conveying component 263 is configured to convey the pre-crushed materials to the first box body 220.

Optionally, the second feed port 261, the break-up component 262 and the screw conveying component 263 can be detachably or fixedly connected, which is not limited in the present application.

Specifically, the break-up component 262 is disposed at an outlet of the second feed port 261, due to the action of gravity, the materials directly enter the break-up component from the second feed port 261, and are pre-crushed by the break-up component 262. The screw conveying component 263 is disposed at a bottom outlet of the break-up component 262. The pre-crushed materials enter the screw conveying component 263, which can stably convey the pre-crushed materials into the first box body 220 at a uniform speed.

Optionally, the second feed port 261 may be a hollow cylinder, a hollow cone, etc.

Optionally, as shown in FIG. 5, the screw conveying component 263 may be a single screw conveyor.

Optionally, one end of the screw conveying component 263 can be connected to a motor (not shown in the figure), and under the drive of the motor, the screw conveying component 263 can uniformly screw out the materials at a uniform speed.

According to the above embodiment, the materials are pre-crushed by the break-up component 262, so that the sizes of the materials can be more uniform, and in subsequent processing, the device or parts will not be blocked because the materials are too large. In addition, the materials can be stably conveyed to the first box body 220 at a uniform speed by the screw conveying component 263, so that the stability of the target materials is improved.

In some embodiments, as shown in FIG. 5, the break-up component 262 includes a third rotation shaft 2621 and a plurality of crushing columns 2622 disposed on the third rotation shaft 2621.

Specifically, along the circumferential direction of the third rotation shaft 2621, one crushing column 2622 can be disposed at every fixed preset distance; along the circumferential direction of the third rotation shaft 2621, one crushing column 2622 can also be disposed at every fixed preset distance, and the shape and size of the plurality of crushing columns 2622 can be the same.

Specifically, one end of the third rotation shaft 2621 can be connected to a motor, and the motor drives the third rotation shaft 2621 to rotate. During the rotation of the third rotation shaft 2621, the plurality of crushing columns 2622 pre-crush the materials.

Optionally, the third rotation shaft 2621 can share one motor with the above screw conveying component 263, and the motor can be disposed at the same end of the third rotation shaft 2621 and the screw conveying component 263. This can reduce the number of driving devices in the crushing and drying device 200.

In some embodiments, as shown in FIG. 5 and FIG. 6, the third rotation shaft 2621 can be horizontally disposed.

In the above embodiment, when the third rotation shaft 2621 is horizontally placed, the contact area between the break-up component 262 and the materials is larger, and the pre-crushing effect of the materials is better.

In some embodiments, the screw conveying component 263 may include at least two spirals 2631 oppositely disposed along the horizontal direction.

Specifically, after the materials enter the screw conveying component 263, the at least two spirals 2631 start to rotate under the drive of the motor. It should be noted that the rotation directions of the two adjacent spirals 2631 can be different, so that the risk of the materials blocking the spirals 2631 can be reduced. In the process of conveying the materials, the at least two spirals 2631 can further mix, stir and crush the materials, that is, the materials can be further processed, and thus the preparation efficiency of the materials can be improved. Therefore, the screw conveying component 263 including at least two spirals 2631 is suitable for materials with large volume, high humidity or need to be stirred.

Figure 7:
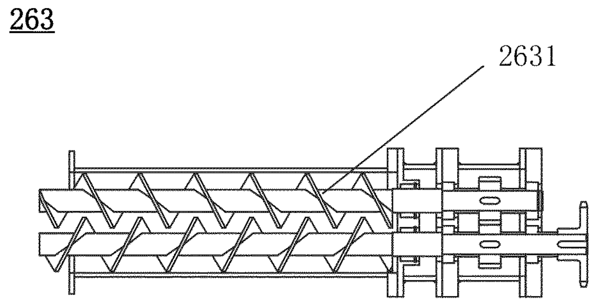
FIG. 7 is a schematic structural diagram of a screw conveying component according to an embodiment of the present application.

Optionally, as shown in FIG. 7, the screw conveying component 263 may include two spirals, that is, the screw conveying component 263 may be a double screw conveyor.

Optionally, the sizes and dimensions of the at least two spirals of the screw conveying component 263 can be the same or different, which is not limited in the present application.

Optionally, as shown in FIG. 7, when the at least two spirals 2631 are disposed opposite to each other along the horizontal direction, that is, parallel to each other, the two spirals 2631 can share one motor. For example, the motor can be disposed at the same end of all the spirals. The spirals 2631 and the motor can be connected to a conveyor belt through a pulley. This can reduce the number of driving devices in the crushing and drying device 200.

While the present application has been described with reference to the preferred embodiments, various modifications may be made and components therein may be replaced with equivalents without departing from the scope of the present application. In particular, the technical features mentioned in the various embodiments can be combined in any manner as long as there is no structural conflict. The present application is not limited to the specific embodiments disclosed herein, but rather includes all technical solutions falling within the scope of the claims.

What is claimed is:

1. A crushing and drying device, comprising:
- a classifier, a first box body, and a second box body connected by detachable connecting elements in sequence along the direction of gravity such that second side walls of the second box body are directly below first side walls of the first box body in the direction of gravity;
- the first box body to accommodate and crush materials, the first box body is a hollow structure;
- the second box body to convey airflow upward through the hollow structure to the first box body to dry the materials; and
- the classifier to screen out and discharge crushed and dried target materials, the target materials being materials with particle sizes less than a preset threshold, wherein
  - the second box body comprises a heat insulating component made of a carbonaceous insulation material at a bottom of the second box body to prevent heat of the airflow from diffusing downward to a bearing seat.

2. The crushing and drying device according to claim 1, wherein
- an air inlet is formed in a second side wall among the second side walls of the second box body; and
- the airflow enters the second box body through the air inlet.

3. The crushing and drying device according to claim 1, wherein the crushing and drying device further comprises a first rotation shaft;
- a crushing component is disposed at a bottom of the first box body, and the crushing component is fixed to the first rotation shaft to crush the materials when the first rotation shaft rotates.

4. The crushing and drying device according to claim 3, wherein the crushing component comprises a body, a rotor, and at least one grinding block;
- the rotor is disposed at a center of the body and fixed to the first rotation shaft; and
- the at least one grinding block is disposed at an end of the body along a horizontal direction.

5. The crushing and drying device according to claim 4, wherein the body is disc-shaped.

6. The crushing and drying device according to claim 4, wherein a stator is disposed on a first side wall among the first side walls of the first box body; and
- along the horizontal direction, the stator and the grinding block are disposed opposite to each other and have a gap therewith.

7. The crushing and drying device according to claim 6, wherein along an extending direction of the first box body, the size of the grinding block is less than that of the stator.

8. The crushing and drying device according to claim 4, wherein the grinding block comprises an alloy material.

9. The crushing and drying device according to claim 1, wherein the classifier comprises:
- a second rotation shaft, a third box body, and a classification wheel;
- a discharge port is formed in a third side wall of the third box body; and
- the classification wheel is disposed at a bottom of the third box body and fixed to the second rotation shaft, for screening the target materials out to the discharge port.

10. The crushing and drying device according to claim 9, wherein the classifier further comprises a scraper having an elastic or rubber strip disposed on an end of the scraper; and the scraper is parallel to the direction of gravity, and one end of the scraper is fixed to a position on the second rotation shaft opposite to the discharge port.

11. The crushing and drying device according to claim 1, wherein the crushing and drying device further comprises:

a feeder, connected to a first side wall among the first side walls of the first box body, to pre-crush the materials, and convey the materials to the first box body.

12. The crushing and drying device according to claim 11, wherein the feeder comprises:

a second feed port, a break-up component, and a screw conveying component connected in sequence along the direction of gravity;

the break-up component to pre-crush the materials; and the screw conveying component to convey the pre-crushed materials to the first box body.

13. The crushing and drying device according to claim 12, wherein the break-up component comprises a third rotation shaft and a plurality of crushing columns disposed on the third rotation shaft.

14. The crushing and drying device according to claim 13, wherein the third rotation shaft is horizontally disposed.

15. The crushing and drying device according to claim 12, wherein the screw conveying component comprises at least two spirals disposed opposite to each other along a horizontal direction.

16. The crushing and drying device according to claim 1, wherein the second box body is entirely below the first box body, and at least one first side wall among the first side walls of the first box body and at least one second side wall among the second side walls of the second box body extend along a same plane in the direction of gravity.

17. A crushing and drying device, comprising:

a classifier, a first box body, and a second box body connected by detachable connecting elements in sequence along the direction of gravity such that second side walls of the second box body are directly below first side walls of the first box body in the direction of gravity;

the first box body to accommodate and crush materials, the first box body is a hollow structure;

the second box body to convey airflow upward through the hollow structure to the first box body to dry the materials; and the classifier to screen out and discharge crushed and dried target materials, the target materials being materials with particle sizes less than a preset threshold, wherein a crushing component is disposed at a bottom of the first box body, the crushing component comprises a body, a rotor, and at least one grinding block, and the second box body comprises a heat insulating component made of a carbonaceous insulation material at a bottom of the second box body to prevent heat of the airflow from diffusing downward to a bearing seat.

18. The crushing and drying device according to claim 17, wherein the second box body is entirely below the first box body, and at least one first side wall among the first side walls of the first box body and at least one second side wall among the second side walls of the second box body extend along a same plane in the direction of gravity.

19. A crushing and drying device, comprising:

a classifier, a first box body, and a second box body connected by detachable connecting elements in sequence along the direction of gravity such that second side walls of the second box body are directly below first side walls of the first box body in the direction of gravity;

the first box body to accommodate and crush materials, the first box body is a hollow structure;

the second box body to convey airflow upward through the hollow structure to the first box body to dry the materials;

the classifier to screen out and discharge crushed and dried target materials, the target materials being materials with particle sizes less than a preset threshold; and a feeder, connected to a side wall of the first box body, to pre-crush the materials, and convey the materials to the first box body, wherein the feeder includes a second feed port, a break-up component, and a screw conveying component connected in sequence along the direction of gravity, the break-up component includes a third rotation shaft and at least three crushing columns disposed on the third rotation shaft to pre-crush the materials, and the second box body comprises a heat insulating component made of a carbonaceous insulation material at a bottom of the second box body to prevent heat of the airflow from diffusing downward to a bearing seat.

20. The crushing and drying device according to claim 19, wherein the second box body is entirely below the first box body, and at least one first side wall among the first side walls of the first box body and at least one second side wall among the second side walls of the second box body extend along a same plane in the direction of gravity.

* * * * *